D. H. LAFFERTY.
BATTER-FEEDERS FOR CAKE-MAKING.
No. 169,556. Patented Nov. 2, 1875.
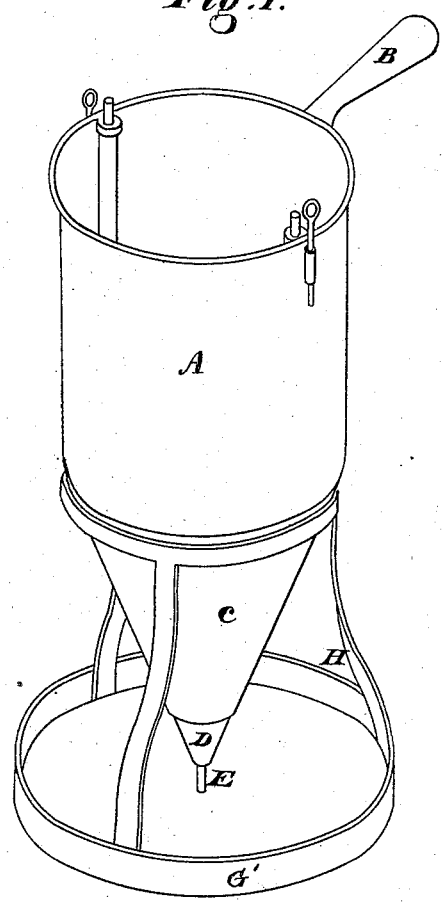
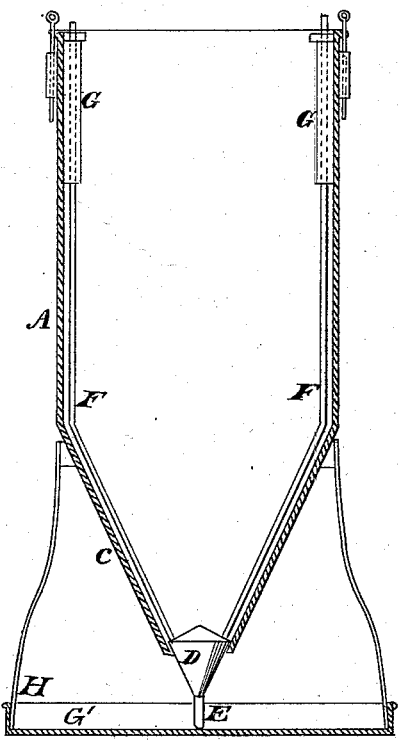
Witnesses
Geo. H. Strong.
Jno. L. Boone.
Inventor
Denis H. Lafferty
by Dewey & Co
Atty's
N. PETERS, PHOTO-LITHOGRAPHER, WASHINGTON, D.C.

UNITED STATES PATENT OFFICE.

DENIS H. LAFFERTY, OF SAN FRANCISCO, CALIFORNIA.

IMPROVEMENT IN BATTER-FEEDERS FOR CAKE-MAKING.

Specification forming part of Letters Patent No. 169,556, dated November 2, 1875; application filed April 2, 1875.

*To all whom it may concern:*

Be it known that I, DENIS H. LAFFERTY, of San Francisco city and county, State of California, have invented a Batter-Feeder for Cake-Making; and I do hereby declare the following description and accompanying drawings are sufficient to enable any person skilled in the art or science to which it most nearly appertains to make and use my said invention without further invention or experiment.

My invention relates to a novel improvement in devices to feed the batter of which cakes are made upon the iron where they are to be cooked, with rapidity.

Referring to the accompanying drawings for a more complete explanation of my invention, Figure 1 is a perspective view of my feeder and supporting-stand. Fig. 2 is a sectional elevation.

A is a vessel of suitable size to contain any desired quantity of batter, and it is provided with a handle, B, for convenience in manipulating. The lower part of this vessel is made conical, as at C, and has an opening of considerable size made in its bottom for the contents to pass through.

In order to close this opening, I make a heavy stopper, D, either ball or conically shaped, and this stopper always lies over the opening by its own gravity. A rod or stem, E, projects from the lower end of this stopper, and it will be seen that when the vessel is lowered sufficiently to allow this stem to touch the iron, the valve or stopper D will be raised, and thus a portion of the contents of the vessel will be allowed to escape.

By raising the vessel the valve will be instantly closed and further flow cut off. This valve will operate sufficiently well without guides, if it be conical; but if any other shape is desired, and it is necessary to guide the stopper in its movements, a single centrally-located rod, having proper guides, may be used; but, for convenience in cleaning and using, I prefer to use two rods, F F, which are secured to the stopper, and extend up on opposite sides, parallel with the conical and straight sides, to the top, where they pass through guides G. These guides are so secured to the sides of the vessel by pins that they can be easily removed, and the whole—valve, rods, and guides—can be taken out for cleaning at any time.

By the use of this implement I am enabled to deposit sufficient batter upon the iron for a cake by rapidly setting the vessel down and raising it up again, and thus the whole iron can be covered in a short time, no time being wasted in pouring, and there being no difficulty experienced by drippings, as the flow is cut off instantly by raising the vessel.

A suitable stand, H, serves to support the implement when not in use and catch any slight dripping. The floor G' of the stand is made close and tight to hold the drippings from the batter-vessel after the vessel has been used and returned to the stand.

Having thus described my invention, what I claim, and desire to secure by Letters Patent, is—

A batter-feeder consisting of the vessel A, having the conical end C and stopper D, in combination with the tripod H, having the tight solid bottom G', substantially as and for the purpose set forth.

In witness whereof I hereunto set my hand and seal.

D. H. LAFFERTY. [L. S.]

Witnesses:
 GEO. H. STRONG,
 JOHN L. BOONE.